April 1, 1941.  W. F. SHURTS ET AL  2,236,652
CLUTCH MECHANISM
Filed May 11, 1938
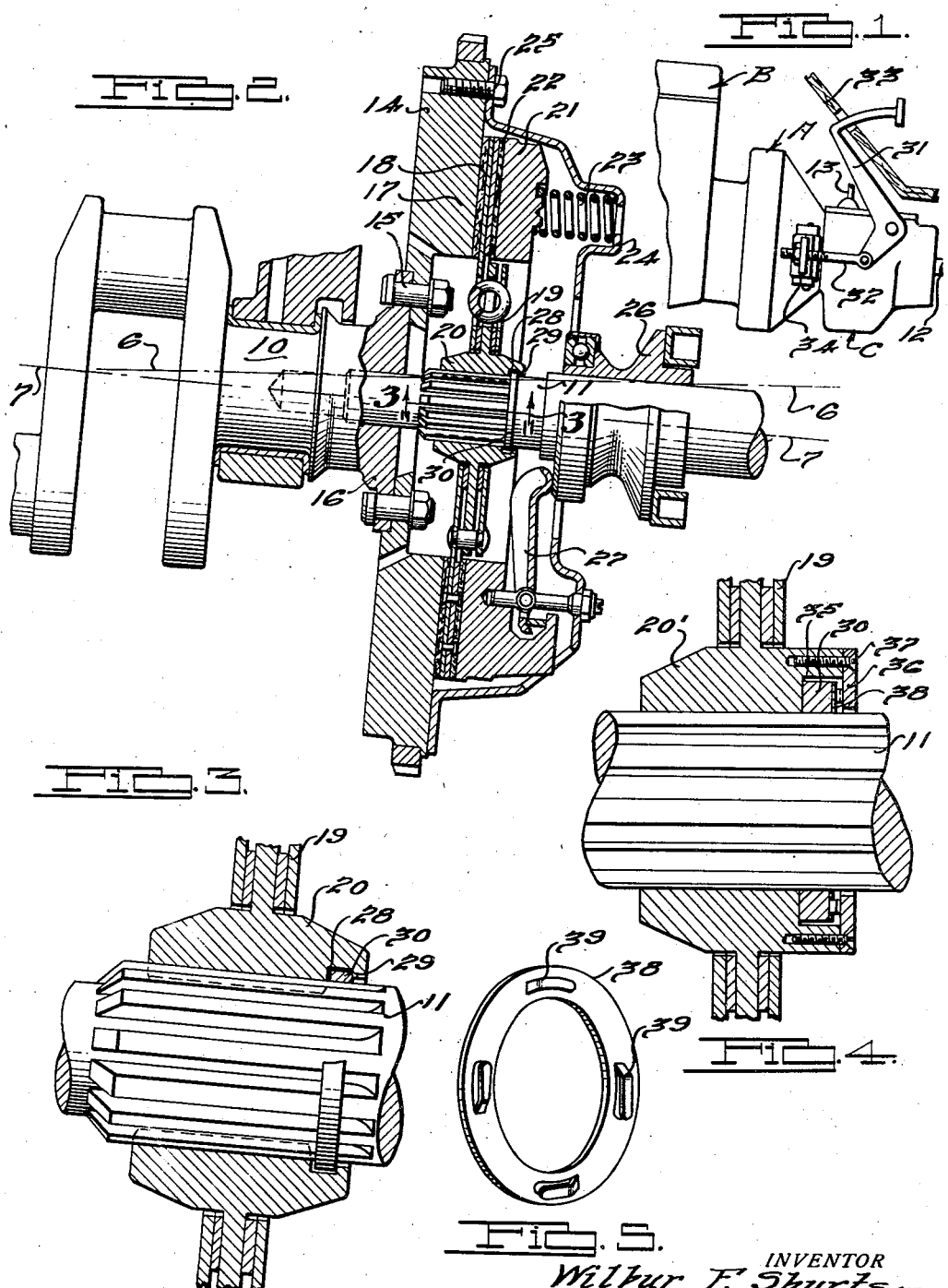
INVENTOR
Wilbur F. Shurts. AND
BY Donald A. Baird.
Harness, Dick, Patee & Harris
ATTORNEYS.

Patented Apr. 1, 1941

2,236,652

UNITED STATES PATENT OFFICE 2,236,652

CLUTCH MECHANISM

Wilbur F. Shurts, Highland Park, and Donald A. Baird, Detroit, Mich., assignors to Chrysler Corporation, Highland Park, Mich., a corporation of Delaware Application May 11, 1938, Serial No. 207,246

9 Claims. (Cl. 192—68)

This invention relates to a clutch mechanism.

The invention is illustrated and described in connection with a friction type clutch especially adapted for use in motor vehicles although it will be understood that the invention in its broader aspects may be incorporated in other types of clutches which may be used in connection with devices other than those herein illustrated.

Clutch mechanisms of the type illustrated are adapted to drivingly connect and disconnect the vehicle engine or prime mover and the speed ratio changing mechanisms and include, among other things, frictionally engageable members for establishing a friction drive between an engine driven element and an element to be driven thereby. The frictionally engageable members are operable to release the friction drive from the engine or prime mover to the speed ratio changing mechanism for accommodating selective operation of the latter in the well-known manner.

An object of the invention is to provide an improved clutch mechanism for controlling the drive from a prime mover to a speed ratio changing mechanism, more particularly, the invention has for its object the provision of a mechanism of the foregoing type which will insure release of the drive from the engine to the speed ratio changing mechanism to facilitate smooth and easy operation of the latter.

Another object of the invention is to provide in a clutch mechanism improved means for controlling operation of one of the clutch members, such as the clutch disk for instance, and to provide means of this type which will automatically adjust the disk to compensate for wear.

A still further object of the invention is the provision of a clutch mechanism having improved characteristics of operation when the axis thereof is disposed at an inclination with respect to the horizontal.

Other objects and advantages of the invention will be more apparent from the following description taken in connection with the accompanying drawing, in which:

Fig. 1 is a fragmentary, side, elevational view of a power plant and speed ratio changing mechanism with which the improved clutch mechanism is associated.

Fig. 2 is an enlarged, longitudinal, sectional view illustrating in detail the clutch mechanism shown in Fig. 1.

Fig. 3 is an enlarged, sectional view taken as indicated by the line 3—3 of Fig. 2.

Fig. 4 is a view similar to Fig. 3 but illustrating another form of the invention.

Fig. 5 is a view in perspective of the spring means shown in Fig. 4.

The improved clutch mechanism, generally indicated by the reference character A, is illustrated in connection with a prime mover such as an internal combustion engine B and a speed ratio changing mechanism C. The engine B is of the well-known type and includes a driving crankshaft 10 having piloted in the rear end portion thereof a shaft 11 adapted to be driven thereby and extending rearwardly into the speed ratio changing mechanism. The drive from the latter is transmitted by means of a shaft 12 to the rear of the driving wheels (not shown) of the vehicle for driving the latter in a well-known manner.

The speed ratio changing mechanism, or transmission C, is of the conventional variable speed type wherein a plurality of gears are adapted to be selectively engaged through operation of the shifter lever 13 for varying the speed ratio, some of which gears are carried by the shaft 11 in the well-known manner and adapted to engage with other gears of the transmission. Inasmuch as the control and operation of the transmission C are well-known, the details thereof have been omitted for the sake of brevity.

The drive from the driving shaft 10 to the driven shaft 11 associated with the transmission C is controlled by the clutch A herein illustrated as of the friction type which is well-known in the art and which includes the flywheel member 14 secured by bolts 15 to a flange 16 of the shaft 10 and constituting the driving member for the clutch mechanism. The flywheel 14 has an annular radially outwardly disposed enlarged portion 17 having a face portion thereof frictionally engageable with the adjacent face of a friction ring 18 carried by the clutch disk assembly 19. The latter has a hub 20 non-rotatably splined on the driven shaft 11 in a manner well-known in the art. The assembly 19 is urged into frictional engagement with the flywheel 14 by a pressure ring 21 engageable with an adjacent face of a friction ring 22 of the assembly 19. The pressure ring 21 is urged against the disk by a plurality of coil springs, one of which is indicated at 23, positioned between the adjacent face of the pressure ring and a cover member 24 secured by bolts, one of which is shown at 25, to the flywheel 14. The clutch mechanism A is located in a position for establishing a drive from the driving shaft 10 to the driven shaft 11 of the transmission, the drive being through the assembly 19 to the latter shaft, it being understood that the assembly is non-rotatably secured to the shaft 11 by the splined arrangement.

Provision is made for releasing the drive from the engine B to the transmission C and in this connection a collar 26 is carried by the shaft 11 and engageable with a plurality of pivotally mounted fingers, one of which is shown at 27, for moving the pressure ring 21 to the right as viewed in Fig. 2 against the action of the springs 23 thereby releasing the clutch disk for frictional engagement with the flywheel 14 and disconnecting the drive between the shafts 10 and 11.

In the operation of the speed ratio changing mechanism C it is desirable that the transmission of driving torque from the clutch disk assembly 19 to the shaft 11 be terminated when the clutch mechanism is actuated to release the position, in order to insure smooth and easy operation of the mechanism C for it will be understood that in the latter mechanism the speed is varied by selectively engaging gears carried by the shaft 11 with other gears. If the clutch disk assembly is subjected to the driving torque difficulty is experienced in engaging and disengaging the transmission gearing and it results in delay in meshing of the gear, gear clashing, undue wear of the latter and undue effort on the part of the vehicle operator to disengage the gear for a particular speed ratio.

It has been deemed desirable, particularly in motor vehicles, to position the engine B, clutch A, and transmission C at an inclination with respect to the horizontal, as is more particularly illustrated in Fig. 2 wherein the line 6—6 indicates the horizontal and the line 7—7 indicates the inclination of the foregoing mechanism with respect thereto. By reason of the inclination of the shaft 11, considerable difficulty has heretofore been experienced in selective operation of the mechanism C due to the fact that upon release of the clutch mechanism the clutch disk assembly would move axially on the shaft 11 to the right, as indicated in Fig. 2, against the pressure ring 21. The weight of the assembly caused the latter to exert a thrust against the pressure ring with the result that a driving torque was transmitted to the assembly and the latter would continue to rotate after release of the clutch.

The latter difficulty is overcome in the improved clutch mechanism herein illustrated wherein the clutch disk assembly is permitted to move axially away from the flywheel 14 sufficiently to release the frictional drive and is not subjected to driving torque from the pressure ring 21. The mounting hub 20 of the assembly 19 has an annular groove 28 formed in the wall bounding the central opening therein for accommodating the shaft 11, the groove being disposed adjacent the end face of the hub nearest the mechanism C. Formation of the groove 28 provides an annular shoulder 29. Positioned within the groove 28 is a slit resilient ring 30, preferably metallic, having an inside diameter less than the diameter of the adjacent portion of the shaft 11 and therefore disposed in gripping or clamping relation with respect to the shaft. The ring 30 has an outer diameter greater than the inside diameter of the shoulder 29 and axial dimension less than the corresponding dimension of the groove 29 and an outer diameter which will permit relative movement of the hub in an axial direction.

In assembly, the ring 30 is compressed sufficiently to be moved past the shoulder 29 into the groove 28 and the shaft 11 moved to the left, as viewed in Fig. 2, through the hub 20 and ring 30, this operation being performed preferably after the assembly has been properly centered with respect to the flywheel. To provide the initial requisite degree of axial movement of the disk and hub for controlling the frictional drive, a shim or shims are removably inserted between the adjacent face of the flywheel and clutch disk plate 18 during assembly, these shims having a thickness equal to the extent of axial movement of the clutch disk to release the drive.

In operation, as the clutch is actuated to release the drive by movement of the pressure ring to the right, as viewed in Fig. 2 in the manner heretofore described, the clutch disk assembly will move axially on the shaft 11 away from the flywheel 14, this movement being induced to some extent by reason of the inclination of the shaft 11. However, movement of the assembly is limited by the wall of the groove opposite the shoulder 29 engaging the ring 30, and such movement will be confined to that representing the differences between the axial dimension of the groove and that of the ring 30. This movement is equal to the thickness of the adjusting shims removably inserted between the adjacent faces of the flywheel 14 and clutch disk plate 18 during assembly as aforesaid. The limited axial movement of the assembly is sufficient to release the drive between the shafts 10 and 11 and the disk is maintained in a position spaced from the ring 21 so that driving torque is not imparted by the latter to the disk.

Another novel feature of the clutch mechanism lies in the automatic adjustment to compensate for wear of the disk plates 18 and 22 as well as the parts 14 and 21. For instance, as the plates wear, the thickness thereof is reduced and it is necessary to adjust the assembly 19 axially with respect to the shaft 11 to obtain the necessary frictional engagement and disengagement. As wear results, the ring 21 is required to move more to the left as viewed in Fig. 1.

As is well-known, the ring 21 is retracted against the action of the springs 23 by operation of a clutch pedal 31 acting through the linkage 32 to move the collar 26 to the left, as viewed in Fig. 1, against the fingers 27. The clutch pedal and linkage operate within predetermined clearances, the pedal having a sufficient clearance with the usual vehicle floor boards 33 to accommodate necessary movement of the disk to an engaging position. As wear occurs, the pedal and linkage are adjusted at 34 to re-establish an operating position, as is well-known. This adjustment causes the ring 21 to assume a position forwardly or to the left as viewed in Fig. 2 beyond the position shown, the clutch pedal and linkage being in turn adjusted to accommodate this positioning of the ring. This newly established released position of the ring 21 necessitates movement of the clutch disk assembly 19 forwardly or to the left, as viewed in Fig. 2, so that when the clutch is released and the ring retracted the disk 18 will not engage the latter for transmitting the drive to the shaft 11.

In the form of the invention herein illustrated, the combined force of the springs 23 acting on pressure ring 21 is sufficient to overcome the gripping action of the ring 30 on the periphery of the shaft 11 so that upon repositioning the ring 21 as aforesaid, the disk assembly 19 is automatically moved toward the flywheel 14 by the shoulder 29 under action of the springs 23. Thus, the disk 18 is at all times maintained in a position to afford an efficient frictional drive and the predetermined clearances thereof with the flywheel 14 maintained. This disk is further maintained out of driving contact with the pressure ring 21 to completely release any driving torque to the assembly in order to facilitate operation of the speed ratio changing mechanism C. It will be apparent, therefore, that with the arrangement illustrated, we have provided a stop for the clutch disk assembly 19 which is automatically adjusted to compensate for wear of the clutch parts.

In the form of the invention illustrated in Figs. 4 and 5, the axes of the shaft 11 and the clutch mechanism are described as disposed on the horizontal and the clutch mechanism is shown in its released position whereby the drive from the shaft 10 to shaft 11 is interrupted. The construction and operation of this form of the invention are generally similar to that illustrated and described in connection with the showing in Fig. 2 and in addition to the latter means is provided for insuring release of the clutch disk from the clutch driving member. The hub 20' of the clutch disk assembly 19 has a counterbore 35 within which is positioned the split resilient ring 30. An annular disk 36 having a central aperture accommodating the shaft 11 is secured to the hub 20' by circumferentially spaced screws 37 and provides an abutment similar to the shoulder 29 shown in Figs. 2 and 3. A disk-like washer 38, preferably of spring steel, is positioned axially intermediate the rear face of the ring 30 and disk 36 and is provided with a plurality of circumferentially spaced spring tongues 39 preferably struck from the body thereof. If desired, the abutment provided by the member 36 may be formed integrally with the hub 20' and the washer 38 split to accommodate assembly.

When the clutch mechanism is in the position shown in Fig. 2 the spring means, provided by the washer 38 and its tongues 39, is compressed by the action of the pressure ring 21 under influence of springs 23. When the clutch mechanism is actuated to released position as hereinbefore set forth, the spring means acting against the abutment provided by the ring 30 urges the clutch disk assembly 19 axially away from the flywheel 14, the wall of the counterbore 39 abutting the adjacent face of the ring 30 to space the disk axially from the pressure ring. In this manner I have provided means for insuring release of the clutch disk 18 from the flywheel 14 and the ring 21.

The requisite degree of axial movement of the clutch disk assembly for disengaging the frictional drive is provided in the manner set forth in connection with the Fig. 2 showing. The ring 30 and member 38 are adjusted axially relative to the shaft 11 to compensate for wear of the clutch parts as in the previous embodiment of the invention.

Although but several specific embodiments of the invention are herein shown and described, it will be understood that various changes in the size, shape and arrangement of parts may be made without departing from the spirit of the invention.

What we claim is:

1. In a clutch mechanism for drivingly connecting driving and driven shafts, driving and driven members secured respectively to said shafts, said driven member being adjustable axially relative to said driving member for controlling the drive therebetween, a pressure member for adjusting said driven member relative to said driving member for establishing a drive therebetween, said pressure member being retractable to accommodate adjustment of said driven member for releasing said drive, said driven shaft and said driven member having their axes inclined relative to the horizontal, whereby said driven member tends to engage said pressure member when the latter is in retracted position, and a stop carried by said driven shaft for retaining said driven member in spaced relation to said pressure member when the latter is in retracted position, said stop including an annulus resiliently engaging said driven shaft.

2. In a clutch mechanism for drivingly connecting and disconnecting driving and driven shafts, driving and driven members secured respectively to said shafts, said driven member being movable axially relative to said driving member, a pressure member for urging said driven member in one direction of its axial movement into driving relation with said driving member, said pressure member being retractable for accommodating axial movement of said driven member into non-driving relation with said driving member, and means including a normally stationary substantially ring-shaped stop resiliently engaging said driven shaft for retaining said driven member in spaced relation to said pressure member when the latter is in its retracted position, said stop being adjustable axially of said driven shaft by said driven member in response to axial movement of the latter by said pressure member.

3. In a clutch mechanism for drivingly connecting and disconnecting driving and driven shafts, driving and driven members secured respectively to said shafts, said driven member including a hub for mounting the same on said driven shaft, said hub having an annular groove in the internal wall thereof, said driven member being movable axially relative to said driving member, a pressure member for urging said driven member in one direction of its axial movement into driving relation with said driving member, said pressure member being retractable for accommodating axial movement of said driven member into non-driving relation with said driving member and means including a ring carried by said driven shaft and extending into said hub groove with a lost motion clearance between the walls thereof for controlling axial movement of said driven member in at least one direction of its axial movement.

4. In a clutch mechanism for drivingly connecting and disconnecting driving and driven shafts, driving and driven members secured respectively to said shafts, said driven member including a hub for mounting the same on said driven shaft, said hub having an annular groove in the internal wall thereof, said driven member being movable axially relative to said driving member, a pressure member for urging said driven member in one direction of its axial movement into driving relation with said driving member, said pressure member being retractable for accommodating axial movement of said driven member into non-driving relation with said driving member, and means including a ring carried by said driven shaft and extending into said hub groove with a lost motion clearance between the walls thereof for controlling axial movement of said driven member, said ring being adjustable axially relative to said driven member by said pressure member for maintaining said driven member in a predetermined position of adjustment relative to said driving member.

5. In a clutch mechanism including a driving member, a driven member axially movable relative to said driving member, an axially movable pressure member for moving said driven member into frictional engagement with said driving member, said pressure member being retractable to accommodate disengagement of said driving and driven member, a normally stationary stop for maintaining said driven member in axially spaced relation to said pressure member when the latter is in retracted position, and yielding means acting against said stop for effecting disengagement of said driving and driven members.

6. In a clutch mechanism including a driving member, a driven member axially movable relative to said driving member, an axially movable pressure member for moving said driven member into frictional engagement with said driving member, said pressure member being retractable to accommodate disengagement of said driving and driven members, yieldable means for moving said driven member axially out of frictional engagement with said driving member when said pressure member is in retracted position, and a normally stationary stop for maintaining said driven member in axially spaced relation to one of said members when the pressure member is in said retracted position, said stop providing an abutment for said yieldable means, said stop being adjustable under the influence of said pressure member to maintain said axially spaced relation substantially constant.

7. In a clutch mechanism including a driving member and a driven member movable axially relative thereto and having a mounting hub, a pressure member operable to move said driven member to a position to frictionally engage said driving member for establishing a frictional drive therebetween, said pressure member being retractable to accommodate movement of said driven member to a position for releasing said frictional drive, and a normally stationary stop engageable with said hub for limiting the axial movement of said driven member, yielding means acting between said hub and said stop for urging said driven member to said released position, said stop being adjustable in response to said operation of said pressure member to compensate for wear of said members so that the release position of said driven member is maintained substantially constant with respect to said driving member.

8. In a clutch mechanism for drivingly connecting and disconnecting driving and driven shafts, driving and driven members secured respectively to said shafts, said driven member including a hub for mounting the same on said driven shaft, said hub having a groove therein, said driven member being movable axially relative to said driving member, a pressure member for urging said driven member in one direction of its axial movement into driving relation with said driving member, said pressure member being retractable for accommodating axial movement of said driven member into non-driving relation with said driving member, a stop carried by said driven shaft and extending into said groove with a lost motion clearance therewith for limiting axial movement of said driven member in at least one direction of its axial movement, and yieldable means for urging said hub into engagement with said stop.

9. In a clutch mechanism for drivingly connecting driving and driven members, a clutch disc assembly including a hub structure drivingly securing said assembly to said driven member for axial movement with respect thereto, a spring actuated pressure member for moving said assembly into frictional engagement with said driving member, said pressure member being retractable to accommodate disengagement of said driving member and said assembly, and a normally stationary stop carried by said driven member and engageable with said hub structure for maintaining said assembly in axially spaced relation to said pressure member when the latter is in retracted position, said stop being adjustable by said hub structure relative to said driven member under the influence of said pressure member to maintain said spaced relation substantially constant.

WILBUR F. SHURTS.
DONALD A. BAIRD.